APPARATUS FOR INSERTING A SIGNAL PORTION INTO A SIGNAL

Filed May 15, 1967 5 Sheets-Sheet 1

INVENTOR.
WILSON P. BOOTHROYD

BY Peter Xiarhos

AGENT.

INVENTOR.
WILSON P. BOOTHROYD

BY Peter Xiarhos

AGENT.

APPARATUS FOR INSERTING A SIGNAL PORTION INTO A SIGNAL

Filed May 15, 1967 5 Sheets-Sheet 3

INVENTOR.
WILSON P. BOOTHROYD

BY *Peter Xiarhos*

AGENT.

July 21, 1970 W. P. BOOTHROYD 3,520,996

APPARATUS FOR INSERTING A SIGNAL PORTION INTO A SIGNAL

Filed May 15, 1967 5 Sheets-Sheet 4

INVENTOR.
WILSON P. BOOTHROYD

BY *Peter Xiarhos*
AGENT.

APPARATUS FOR INSERTING A SIGNAL PORTION INTO A SIGNAL

Filed May 15, 1967 5 Sheets-Sheet 5

INVENTOR.
WILSON P. BOOTHROYD
BY Peter Xiarhos
AGENT.

United States Patent Office 3,520,996

Patented July 21, 1970

3,520,996
APPARATUS FOR INSERTING A SIGNAL PORTION INTO A SIGNAL

Wilson P. Boothroyd, Carlisle, Mass., assignor to Sylvania Electric Products Inc., a corporation of Delaware Filed May 15, 1967, Ser. No. 638,314
Int. Cl. H04b *1/00*
U.S. Cl. 179—1 11 Claims

ABSTRACT OF THE DISCLOSURE

Audio expansion system utilizing apparatus operable to periodically and repetitively insert discrete signal portions into a continuous stream of audio information sensed from an original recording played back at a speed decelerated from the original recording speed. The audio information, having a level of pitch lower than the level of pitch of the original recording, is applied to a multi-tapped delay line and sampled at each tap. Because of the manner of sampling and the delay provided by the delay line, the level of the pitch of the audio information applied to the delay line is raised to the level of the pitch of the original recording, and a plurality of discrete signal portions are periodically and repetitively inserted into the audio information, thereby permitting an increase in the normal playback time of the original recording.

BACKGROUND OF THE INVENTION

The invention described in the instant application relates to apparatus for inserting a discrete signal portion into a signal and, more particularly, to an audio expansion system embodying such apparatus.

Normally, audio information, such as sound or connected speech, is recorded on magnetic recording tape, wire, or disc at a particular constant speed and the recording so formed reproduced by conventional playback apparatus at the original recording speed to recover the audio information. From the foregoing, it follows that the pitch of the reproduction, that is the highness or lowness of the sounds of the reproduction, and the tempo, are the same as the pitch and tempo of the original recording. Moreover, the time required to reproduce the original audio recording is equal to that required to record the audio information.

It has been discovered that the time usually required to reproduce or "play back" an original audio recording may be lengthened appreciably by repetitively and periodically adding discrete signal portions thereto. In one prior art audio expansion system, exemplified by a U.S. patent to Fairbanks et al., No. 2,886,650, this increase in playback time has been accomplished by periodically electrically repeating short-duration portions of an original recording, preparing a second recording containing the repeated portions interspersed with the original audio information, and thereafter playing back such second recording in the increased period of time.

SUMMARY

Like the Fairbanks et al. system and other systems of the same general nature, the apparatus of the present invention, when employed in an audio expansion system, functions to insert very small signal portions of audio information into a stream of audio information whereby the playback time of an original recording may be lengthened as desired. A principal advantage of the instant invention is its essentially completely electronic nature. Thus, the requirements of plural recording heads, bulky mechanical moving elements, and synchronization apparatus for accurately and precisely timing the operation of such elements, as described in the Fairbanks et al. patent, for example, are avoided by the present invention. Additionally, because of the ready adaptability of the apparatus of the invention to existing recording and playback equipment without extensive modifications, and the simplified arrangement and operation of the elements comprising the invention, the apparatus of the present invention is particularly suited for use in the fields of education, speech and language research, and broadcasting.

Briefly, the apparatus of the invention for inserting a signal portion into a signal comprises a delay means having a predetermined duration of delay, a plurality of $n$ output terminal means spaced along the delay means, a means for sampling said output terminal means, and a signal converting means. In operation, a signal into which a signal portion is to be inserted is applied to an input of the delay means and propagated along the delay means. The signal increments appearing at the plurality of output terminal means as a result of the propagation of the applied signal are then sampled in sequence by the means for sampling in a direction opposing the direction of propagation of the signal and at a frequency related to the amount of the signal portion to be inserted into the signal. A sampled signal is provided to a signal converting means by the means for sampling for each sampling of an output terminal means. After the $n$th output terminal means has been sampled by the means for sampling, a signal portion equal to the duration of the delay means is provided by the means for sampling to the signal converting means. The plurality of sampled signals and the signal portion are converted by the signal converting means to a continuous output signal.

In a first embodiment of the invention, the inserted signal portion is introduced by means of a second delay means included in the means for sampling. The second delay means serves to inhibit further sampling of the output terminal means, after the sampling of the $n$th output terminal means, for a period equal to the duraiton of the delay means to which the input signal was initially applied. A signal provided by the means for sampling during the period of delay of the second delay means constitutes the signal portion which is inserted into the signal applied to the delay means.

In a second embodiment of the invention, the sampling of an output terminal means subsequent to the sampling of the $n$th output terminal means is not inhibited. Instead, a portion of the applied input signal is resampled by the means for sampling, that is, repeated. More specifically, after the sampling of the $n$th output terminal means has taken place, the increments of the input signal still present in the delay means are resampled at predetermined ones of said output terminal means. The resampled portion, equal to the duration of the delay means, constitutes the signal portion which is inserted into the signal applied to the delay means.

The above-described apparatus for inserting a signal portion into a signal is particularly suitable for use in an audio expansion system since, by inserting several very small signal portions into recorded audio information, the playback time of a recording can be lengthened by any desired, yet reasonable, amount. When the above-described apparatus for inserting a signal portion into a signal is used in such an audio expansion system, the continuous signal applied to and propagated along the delay means takes the form of continuous audio information of a predetermined level of pitch, more specifically, a level of pitch established by decelerating the playback speed of a recording from the original recording speed by a predetermined amount. The specific amount of deceleration is established in accordance with the desired increase in the playback time of the original recording.

The audio information is treated in the delay means in the same manner as described above with the result that the audio output information provided by the above-described apparatus is characterized by a level of pitch higher than the predetermined level of the pitch of the audio information applied to and propagated along the delay means, but of the same level of pitch as the original recording. Moreover, the audio output information occurs in the same period of time as the audio input information.

DESCRIPTION OF THE PREFERRED EMBODIMENT

Figure 1:
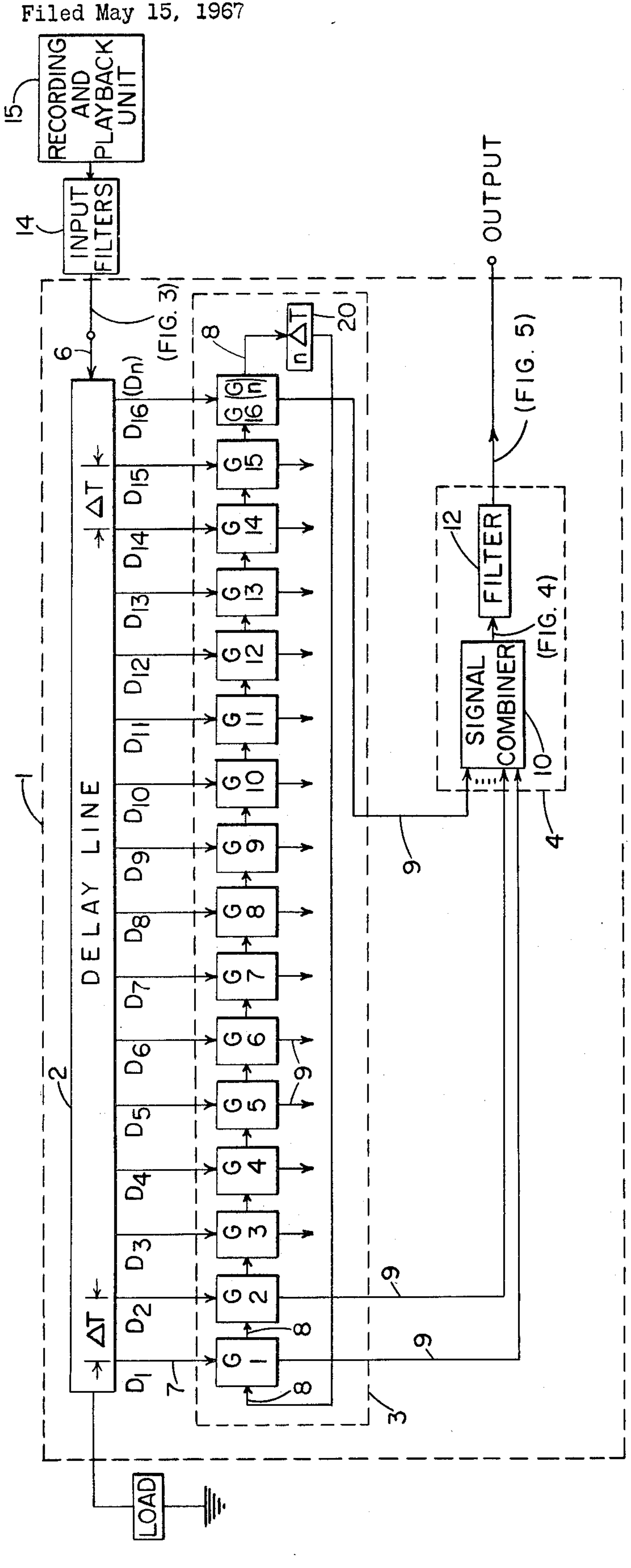
FIG. 1 is a block diagram of an audio expansion system embodying the apparatus of the invention for inserting discrete signal portions into a signal.

Referring to FIG. 1, the apparatus for inserting a discrete signal portion into a continuous signal is shown generally at 1 and comprises an electrical delay line 2 having a plurality of $n$ output taps $D_1 \ldots D_n$, the taps being separated by a duration $\Delta T$, a sampling arrangement 3 including an electrical delay means 20, and a signal converting means 4. For purposes of the system illustrated in FIG. 1, $n=16$. The sampling arrangement 3, in addition to the second delay means 20, comprises a plurality of gates $G_1 \ldots G_n$, each gate having an input line 7 connected to an associated output tap, a transfer line 8 connected to the next succeeding gate, and an output line 9. Each output line 9 is coupled to the signal converting means 4 which includes a signal combiner 10 and a filter 12. For the sake of simplicity in the drawing, only three of the output lines 9 are shown coupled to the signal converting means 4.

In addition to the signal insertion apparatus 1, FIG. 1 further illustrates in block diagram form an audio expansion system of the invention. As shown therein, the audio expansion system comprises the previously described apparatus, a recording and playback unit 15, and input filters 14. The unit 15 and the filters 14 are coupled to the delay line 2 via an input line 6. The recording and playback unit 15 is adapted to provide the source of audio playback information as sensed from an original recording played back at a speed decelerated from the original recording speed as previously mentioned. The input filters

14 are provided for the elimination of input frequencies which might cause undesired sampling products. The operation of the signal insertion apparatus and the audio expansion system of FIG. 1 will now be described in detail in conjunction with FIGS. 2 through 5. The operation of the system of FIG. 1 with a modified sampling arrangement will be described in conjunction with FIGS. 6 and 7.

Figures 2, 3:
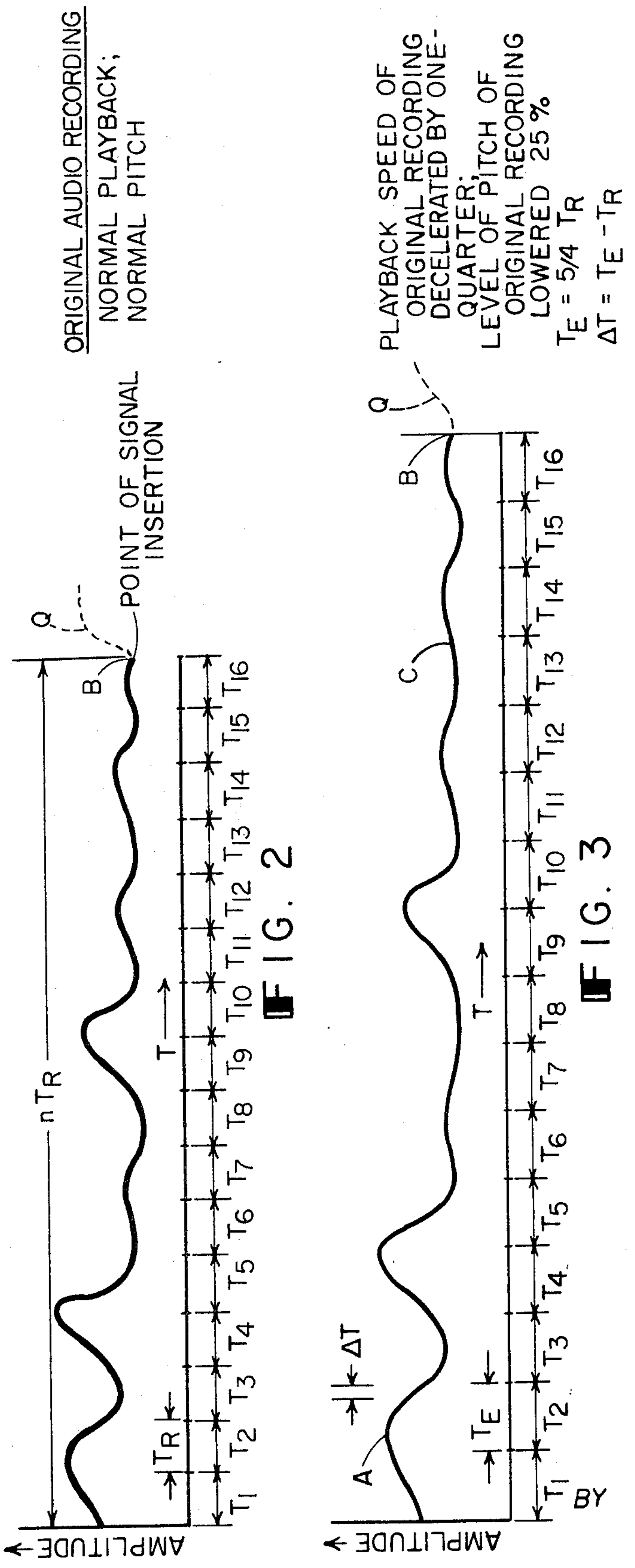
FIG. 2 is an amplitude-time waveform of a segment of audio information as sensed from an original audio recording reproduced at the original recording speed, and characterized by normal pitch.
FIG. 3 is an amplitude-time waveform of a segment of audio information as sensed from an audio recording reproduced at a speed decelerated one-quarter from the original recording speed, and characterized by a 25 percent drop in the level of pitch from the level of the pitch of the original recording.

FIG. 2 illustrates the waveform of a segment of audio information as sensed by a playback head from an original audio recording contained in the unit 15, FIG. 1, and played back at the same speed at which the audio information was recorded, that is, at normal playback speed. The time base of the waveform is divided into a plurality of equally spaced time intervals $T_1 \ldots T_{16}$, the duration $T_R$ of each interval being established in accordance with well known sampling techniques to be less than one-half the period of the highest frequency component of the audio information. The duration of the segment $nT_R$ in FIG. 2 should be longer than the period of the lowest audio frequency to be reproduced. Thus, $n$ should be greater than twice the ratio of the highest frequency to be reproduced and the lowest frequency to be reproduced. The point B in FIG. 2 represents the point at which it is desired to insert a signal portion in order to expand the audio segment shown in solid form in FIG. 2. The designation Q in FIG. 2 and in the following figures represents a portion of a segment of audio information which immediately follows the audio segment shown in solid form in FIG. 2.

Assume now that it is desired to insert a signal portion into the normal playback audio information shown in FIG. 2 at the point B and before the portion Q as mentioned above such that an increase of one-quarter in the playback time of the originally recorded audio information may be realized. To accomplish this desired result, it is necessary to decrease the playback speed of the original recording contained in the unit 15 of FIG. 1 by one-quarter, to sense the audio information from the recording at the decreased speed, and to apply the sensed audio information to the input line 6 of the delay line 2. The waveform of such audio information obtained upon decelerating the playback speed by one-quarter is illustrated in FIG. 3. As expected, the audio information is characterized by a twenty-five percent decrease in the level of pitch from the level of the pitch of the original audio information of FIG. 2. That is, by decelerating the playback speed by one-quarter, each interval $T_R$ of the waveform of FIG. 2 is increased by one-quarter. Such an increased interval is shown as $T_E$ in FIG. 3. The amount by which the interval is lengthened is shown as $\Delta T$, where $\Delta T$ is equal to $T_E - T_R$.

To insert a signal portion into the audio information shown in FIG. 2 at the point B, and to normalize the level of the pitch of the segment of audio information of FIG. 3 to the level of the pitch of the segment of audio information of FIG. 2, the delay line 2 of FIG. 1 is provided with sixteen taps ($n=16$), one tap corresponding to each of the time intervals $T_1$ to $T_{16}$ in FIG. 2. Each tap is separated by the duration of $\Delta T$ of a value as determined above from the relationship of $T_E$ to $T_R$.

The segment of audio information shown in FIG. 3 is applied to the input line 6 of the delay line 2 and propagated along the delay line toward a non-reflecting load impedance which terminates the delay line 2 in a conventional manner. As the audio segment is propagated along the delay line 2, it is sampled in sequence by the sampling gates $G_1 \ldots G_{16}$ at a frequency related to the signal portion to be inserted and in the direction indicated in FIG. 1 by the transfer lines 8. In FIG. 3, the point A of the audio segment corresponds to the increment sampled at the gate $G_1$. That is, point A of the audio segment appears at gate $G_1$ at the moment that the gate $G_1$ is operated. At each of the sixteen delay line taps $D_1 \ldots D_{16}$, that is, at each of sixteen time intervals $T_R$, a sampled signal is provided by the sampling gates $G_1 \ldots G_{16}$.

After the sampling of the last tap $D_{16}$ by the gate $G_{16}$ has taken place, the sampling of the first tap $D_1$ by the gate $G_1$ is not immediately reinitiated by the gate $G_{16}$ via its associated transfer line 8. As shown in FIG. 1, the operation of the gate $G_1$ is delayed by a period of time equal to $n\Delta T$, or as shown in FIG. 1, $15\Delta T$. This period of delay, provided by the delay means 20 coupled between the gates $G_{16}$ and $G_1$, is equal to the period of delay of the delay line 2, and is required because the sampling sequence occurs in a period of time less than the duration of the applied segment of audio information (FIG. 3) by $n\Delta T$. Thus, during the interval $n\Delta T$ provided by the delay means 20, no sampling of the taps $D_1 \ldots D_{16}$ takes place. Instead, during that interval, the first portion of a new segment of audio information such as shown at Q in the figures, is loaded into and propagated along the delay line 2. At the termination of the $n\Delta T$ delay interval, such subsequent segment of audio information can then be sampled by the gates $G_1 \ldots G_{16}$ in the manner just described in connection with the audio segment shown in FIG. 3.

Because of the sampling-inhibiting effect of the delay means 20, a discrete signal portion is inserted into the audio information of FIG. 2 at the point B. That is, since no sampling takes place during the $n\Delta T$ interval, no sampled signals are applied to the signal combiner 10 from any of the output lines 9 during said interval. Accordingly, a signal portion having an amplitude which corresponds to zero sampling level is provided immediately after the interval $T_{16}$. When such a signal portion is received by the human ear, it is interpreted as an essentially imperceptibly short period of silence. The period of silence has the effect of lengthening the audio segment shown in solid form in FIG. 2.

Figure 4:
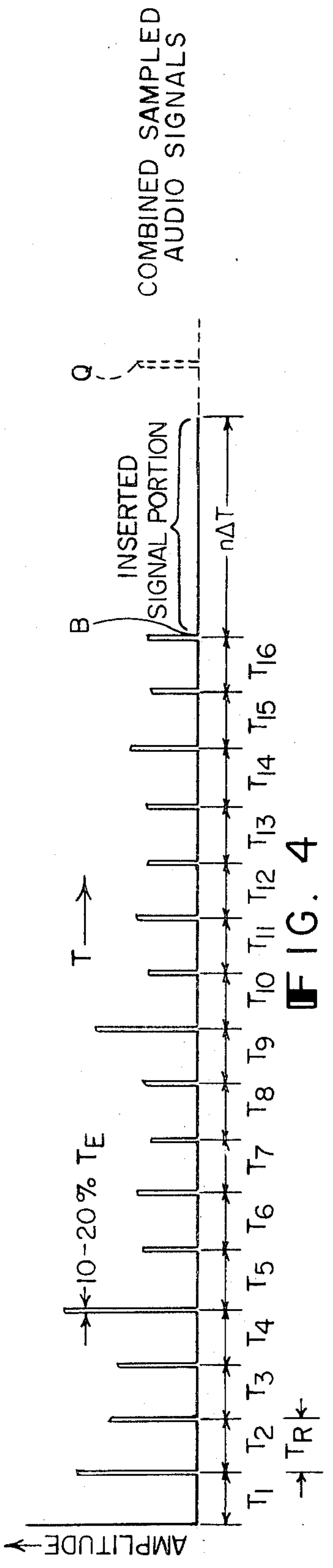
FIG. 4 is the waveform of a composite signal derived by combining the sampled signals acquired upon sampling the segment of audio information of FIG. 3 with a sampling arrangement included in the apparatus of FIG.1.

When the abovedescribed sampled signals provided by the sampling gates $G_1 \ldots G_{16}$ during the interval $T_1 \ldots T_{16}$ are applied to the signal combiner 10 together with the zero amplitude portion, and combined thereby, the composite signal having the waveform of FIG. 4 results.

As shown in FIG. 4, the individual sampled signals from the gates $G_1 \ldots G_{16}$, separated by a value of $T_R$ (or $T_E - \Delta T$), have amplitudes corresponding to the amplitudes of the sampled portions of the propagated audio information of FIG. 3 and widths equal to approximately 10% to 20% of the value of the duration $T_E$. The 10% to 20% figure is achieved by constructing the gates $G_1 \ldots G_{16}$ in a known manner to permit passage of sampled signals to the gate output lines 9 only during the 10% to 20% time period.

The composite serial train of pulses provided by the signal combiner 10, in a wide-band form, is thereupon applied to the low pass filter 12 which serves to filter out the sampling frequency of the sampling gates $G_1 \ldots G_{16}$ to provide a single continuous audio output signal having a smooth configuration. The waveform of such an audio output signal is shown in FIG. 5.

Figure 5:
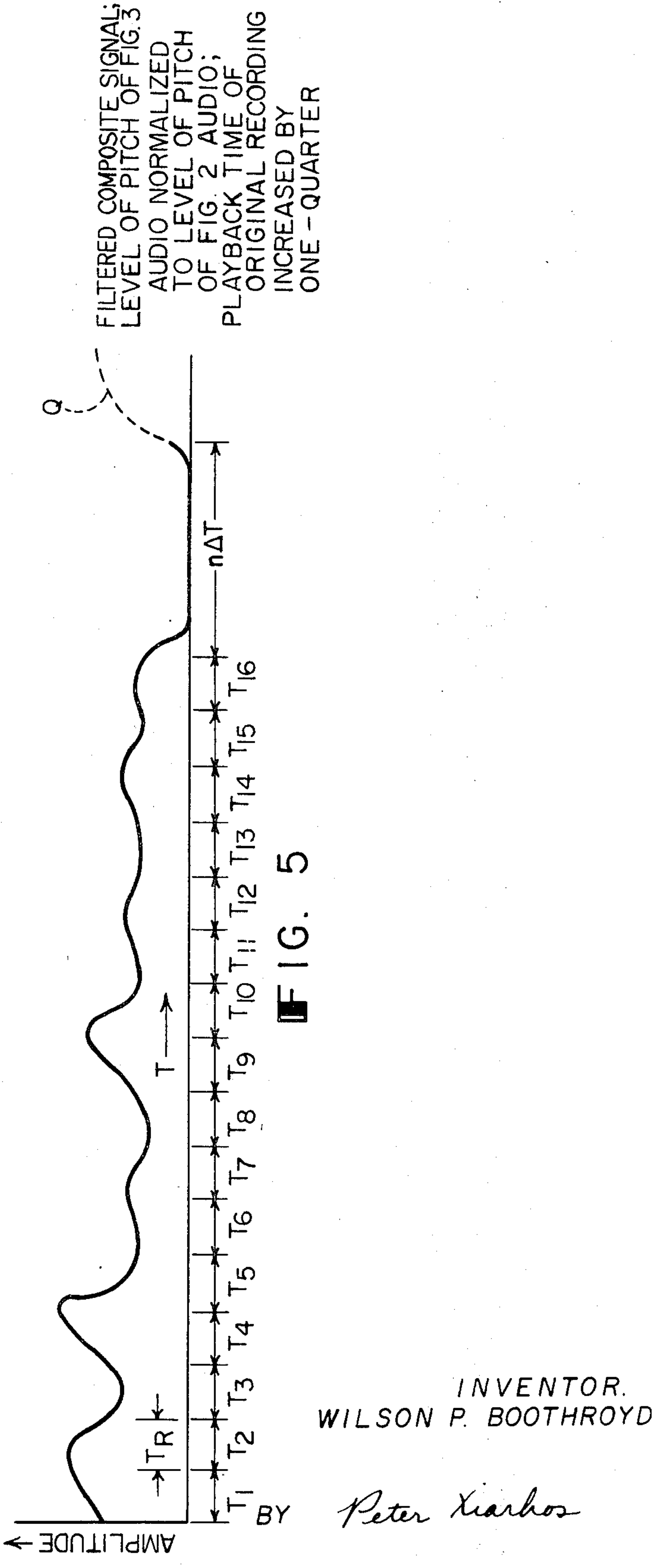
FIG. 5 is an amplitude-time waveform of the composite signal shown in FIG. 4 after filtering, the filtered signal being characterized by a level of pitch which is the same as the level of the pitch of the segment of audio information of FIG. 2 and occurring in the same period of time as the segment of audio information of FIG. 3.

It may be noted from FIG. 5 that the pitch of the audio output signal is the same as the pitch of the signal illustrated in FIG. 2. That is, the intervals T in FIG. 2 and in FIG. 5 are of the same duration. This result obtains from the fact that the audio information of FIG. 3 is sampled at intervals $T_R$, the interval $T_R$ being less than the interval $T_E$ by $\Delta T$. Also, it may be noted that the output signal has essentially the same configuration as the waveform of FIG. 2 with the exception that a signal portion has been inserted into the audio information of FIG. 2 at the point B and before the next segment Q.

It should now be obvious that if a continuous stream of audio information as sensed from a playback head from an original recording at a decelerated playback speed is applied to the input line 6 of the delay line 2, and very small portions are periodically and repetitively inserted therein, each inserted portion being equal to $n$ times $\Delta T$, the audio output information appearing at the output terminal of the signal combiner 4 represents an expanded version of the original audio recording. Such version, when applied to a suitable headset or loudspeaker apparatus, is decreased in tempo from the tempo of the original recording, and is therefore played back in a period of time greater than the playback time of the original recording.

In the discussion presented above, a signal portion was inserted into a signal by utilizing a delay means 20 included in the sampling arrangement 3 in FIG. 1. It is to be understood, however, that a signal portion can be inserted into an existing signal after the $n$th sample has been taken without inhibiting the sampling operation of the sampling gates $G_1 \ldots G_{16}$ as described hereinabove. Specifically, if the delay means 20 of FIG. 1 is replaced with a plurality of series-connected sampling gates similar to the gates $G_1 \ldots G_{16}$ and the input line of such gates coupled to selected ones of the output taps of the delay line 2, it is possible to resample a portion of the audio signal still being propagated along the delay line 2 and for the resampled portion to constitute the signal insertion. The modified arrangement for accomplishing this resampling operation is shown in FIG. 6.

Figure 6:
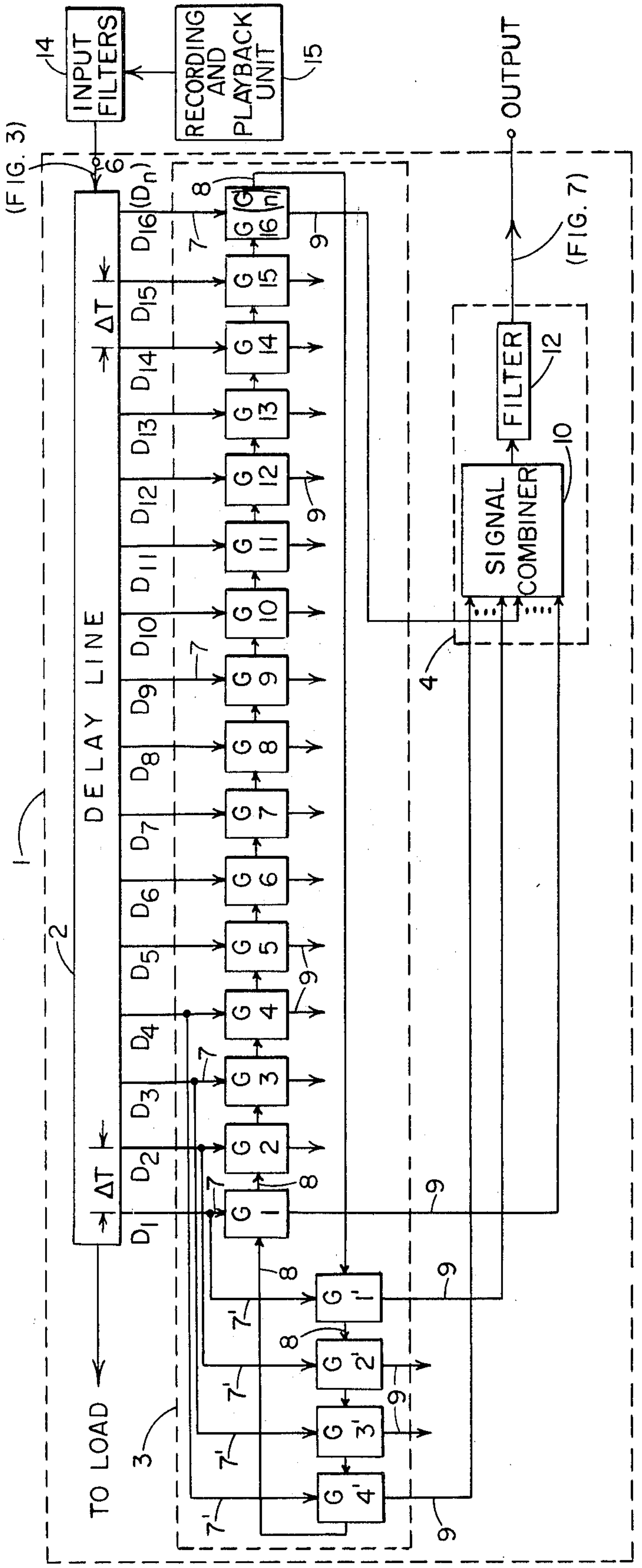
FIG. 6 is a block diagram of the audio expansion system of FIG. 1 utilizing a modified sampling arrangement.
Figure 7:
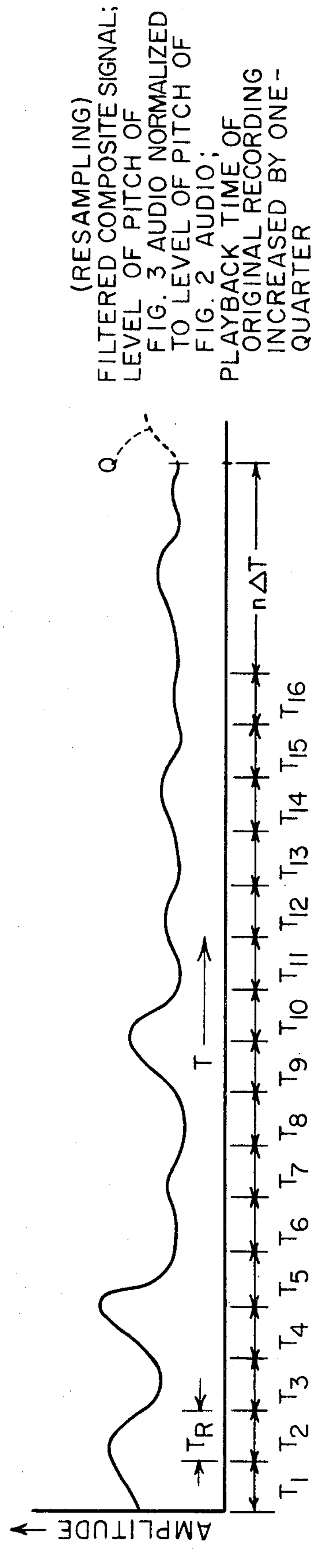
FIG. 7 is an amplitude-time waveform of the audio information of FIG. 3 when a discrete signal portion is added thereto by resampling a portion thereof with the modified sampling arrangement of FIG. 6.

As shown nn FIG. 6, the delay means 20 of FIG. 1 is replaced with four additional gates $G_1' \ldots G_4'$ of the same construction as the gates $G_1 \ldots G_{16}$. Each of the sampling gates $G_1' \ldots G_4'$ is coupled to the delay line 2 via an input line 7, to the next succeeding gate via a transfer line 8, and to the signal combiner 10 via an output line 9. The total delay provided by the four gates is equal to $n\Delta T$ or, as shown in FIG. 4, $4T_R$. The operation of the audio expansion system of FIG. 6 is as follows.

Assume that point A of the segment of audio information of FIG. 3 appears at the gate $G_1$ as the sampling sequence commences. The signal increments appearing at the taps $D_1 \ldots D_{16}$ are sampled in sequence, and sampled signals are provided by the output lines 9 of the sampling gates $G_1 \ldots G_{16}$ to the signal combiner 10. After the gate $G_{16}$ is operated to sample the tap $D_{16}$, sequential operation of the gates $G_1' \ldots G_4'$ is initiated. At the moment the gate $G_1'$ is actuated, a quantity of the previously-applied segment of audio information is still present in the delay line 2. This quantity has a duration equal to $n\Delta T$, in other words, the period of delay provided by the delay line 2. As shown in FIG. 3, the portion of the applied audio information present in the delay line 2 at the time the gate $G_1'$ is actuated appears between the points B and C. The portion of the audio information between the points B and C is resampled by the gates $G_1' \ldots G_4'$. Thus, the gates $G_1' \ldots G_4'$ provide four sampled signals to the signal combiner 10 in addition to those previously provided by the gates $G_1 \ldots G_{16}$.

The sampled signals provided by the sampling gates $G_1 \ldots G_{16}$ and $G_1' \ldots G_4'$ are combined and filtered by the signal converting means 4. The output audio information assumes the configuration of the waveform shown in FIG. 7. As shown therein, the signal insertion $n\Delta T$ appears immediately following the interval $T_{16}$ at the point B and just before the subsequent segment of audio information at Q.

CONCLUSION

The various elements comprising the apparatus of the invention are individually of a conventional nature. Thus, the electrical delay line 2 may be of the discrete component or carrier type and may have movable output taps. The delay means 20 may be a lumped delay. The sampling gating arrangement may be of any type which provides short duration sampled signals (10%–20% of $T_E$) spaced apart by a duration of $T_R$. For example, a suitable gating arrangement useful in the apparatus of the invention includes a plurality of diode gates operated by an external timing source at appropriate sampling intervals. The signal combiner 10 typically is a transistor linear amplifier having a resistive input associated with each sampled signal.

It will now be apparent that a novel apparatus for inserting a signal portion into a signal and an audio expansion system have been disclosed in such full, clear, concise, and exact terms as to enable any person skilled in the art to which they pertain to make and use the same. It will also be apparent that various changes and modifications may be made in form and detail by those skilled in the art without departing from the sprit and scope of the invention. Therefore, it is intended that the invention shall not be limited except as by the appended claims.

What is claimed is:

1. Apparatus for inserting a signal portion into a signal comprising:

delay means having a predetermined duration of delay, said delay means being adapted to receive an input signal and to propagate the input signal in a direction of propagation along the length of the delay means;

a plurality of $n$ output terminal means spaced along the length of the delay means;

means adapted to sequentially sample, in a direction opposing the direction of propagation of said input signal and at a frequency related to the ratio of the signal portion to be inserted to the input signal, the increments of said input signal appearing at said plurality of $n$ output terminal means whereby a plurality of sampled signals are provided by said means, said means being further adapted to provide after the sampling of the $n$th output terminal means a signal portion of a duration equal to the duration of the delay of said delay means; and conversion means adapted to convert said plurality of sampled signals and said signal portion to a continuous output signal.

2. Apparatus for inserting a signal portion into a signal comprising:

delay means having a predetermined duration of delay, said delay means being adapted to receive an input signal and to propagate the input signal in a direction of propagation along the length of the delay means;

a plurality of $n$ output terminal means spaced along the length of the delay means;

sequencing means operative to sequentially sample, in a direction opposing the direction of propagation of said input signal and at a frequency related to the ratio of the signal portion to be inserted to the input signal, the increments of said input signal appearing at said plurality of $n$ output terminal means whereby a plurality of sampled signals are provided by said sequencing means;

inhibiting means adapted to inhibit the sampling operation of said sequencing means for a period equal to the duration of the delay of said delay means whereby a signal portion is provided by said sequencing means; and conversion means adapted to convert said plurality of sampled signals and said signal portion to a continuous output signal.

3. Apparatus in accordance with claim 2 wherein said sequencing means includes:

a plurality of interconnected gate means, each gate means having an input line coupled to a corresponding output terminal means, a transfer line coupled to the next succeeding gate means, and an output line coupled to said conversion means.

4. Apparatus in accordance with claim 2 wherein said conversion means comprises:

combining means adapted to combine said plurality of sampled signals and said signal portion provided by said sequencing means; and means adapted to filter the combined signal provided by said combining means to remove the sampling frequency of said sequencing means.

5. Apparatus for inserting a signal portion into a signal comprising:

delay means having a predetermined duration of delay, said delay means being adapted to receive an input signal having a plurality of equally-spaced first time intervals and to propagate the input signal in a direction of propagation along the length of the delay means;

a plurality of $n$ output terminal means spaced along the length of the delay means, said output terminal means being separated by a duration $\Delta T$;

sequencing means operative to sequentially sample, in a direction opposing the direction of propagation of the input signal, the increments of said input signal appearing at said plurality of $n$ output terminal means at second time intervals, each second time interval being equal to a first time interval decreased by $\Delta T$, whereby a plurality of sampled signals are provided by said sequencing means;

inhibiting means adapted to inhibit the sampling operation of said sequencing means for a period equal to the duration of the delay of said delay means whereby a signal portion is provided by said sequencing means; and conversion means adapted to convert said plurality of sampled signals and said signal portion to a continuous output signal.

6. Apparatus for inserting a signal portion into a signal comprising:

delay means adapted to receive an input signal and to propagate the input signal in a direction of propagation along the length of the delay means;

a plurality of output terminal means spaced along the length of the delay means;

sampling means adapted to sequentially sample, in a direction opposing the direction of propagation of the input signal and at a frequency related to the ratio of the signal portion to be inserted to the input signal, the increments of said input signal appearing at said plurality of output terminal means coincident with the sampling of the output terminal means whereby a plurality of sampled signals are provided by said sampling means; and conversion means adapted to convert said plurality of sampled signals to a continuous output signal.

7. Apparatus in accordance with claim 6 wherein said sampling means includes:

a plurality of interconnected gate means, each gate means having an input line coupled to a corresponding output terminal means, a transfer line coupled to the next succeeding gate means, and an output line coupled to said conversion means.

8. Apparatus in accordance with claim 6 wherein said conversion means comprises:

means adapted to combine said plurality of sampled signals into a serial train of pulses; and means adapted to filter said serial train of pulses to remove the sampling frequency of the sampling means.

9. Apparatus for inserting a signal portion into a signal comprising:

delay means adapted to receive an input signal and to propagate the input signal in a direction of propagation along the length of the delay means;

a plurality of $n$ output terminal means spaced along the length of the delay means;

first sequencing means operative to sequentially sample, in a direction opposing the direction of propagation of said input signal and at a frequency related to the ratio of the signal portion to be inserted to the input signal, the increments of said input signal appearing at said plurality of $n$ output terminal means whereby a first plurality of sampled signals are provided by said first sequencing means;

second sequencing means operative to sequentially sample, in a direction opposing the direction of propagation of said input signal and at a frequency related to the ratio of the signal portion to be inserted to the input signal, the increments of said input signal appearing at selected ones of said plurality of $n$ output terminal means whereby a second plurality of sampled signals are provided by said second sequencing means; and conversion means adapted to convert said first and second plurality of sampled signals to a continuous output signal.

10. Audio information expansion apparatus comprising:

means for providing audio information of a predetermined pitch;

delay means having a predetermined duration of delay, said delay means being adapted to receive said audio information and to propagate the audio information in a direction of propagation along the length of the delay means;

a plurality of $n$ output terminal means spaced along the length of the delay means, said output terminal means being separated by a duration $\Delta T$;

sequencing means operative to sequentially sample, in a direction opposing the direction of propagation of the audio information and at a predetermined frequency, the increments of the audio information appearing at said plurality of $n$ output terminal means during each sequence of sampling of said $n$ output means whereby a plurality of sampled signals are provided during each sequence of sampling of said $n$ output terminal means;

inhibiting means adapted to inhibit the sampling operation of said sequencing means for a period equal to the duration of the delay of said delay means whereby a signal portion equal to $n$ times $\Delta T$ is provided after each sequence of sampling of said output terminal means; and conversion means adapted to convert said plurality of sampled signals provided during the sampling sequences and said signal portions provided after each sampling sequence to output audio information characterized by a pitch higher than said predetermined pitch of said audio information.

11. Audio information expansion apparatus comprising:

means for providing audio information of a predetermined pitch;

delay means adapted to receive said audio information and to propagate the audio information in a direction of propagation along the length of the delay means;

a plurality of $n$ output terminal means spaced along the length of the delay means, said output terminal means being separated by a duration $\Delta T$;

sampling means adapted to sequentially sample, in a direction opposing the direction of propagation of the audio information and at a predetermined frequency, the increments of the audio information apearing at said plurality of $n$ output terminal means in coincidence with the sampling of said output terminal means whereby a plurality of sampled signals are provided by said sampling means and a portion of the audio information equal to $n$ times $\Delta T$ is repeated; and conversion means adapted to convert said plurality of sampled signals to output audio information characterized by a pitch of higher than said predetermined pitch of said audio information.

References Cited

UNITED STATES PATENTS

| | | | |
|---|---|---|---|
| 1,735,037 | 11/1929 | Carpe | 179—15.55 |
| 2,650,949 | 10/1953 | Veaux | 179—15.55 |
| 2,984,706 | 5/1961 | Jamison et al. | 179—15 |
| 3,304,372 | 2/1967 | Filipowsky et al. | |

KATHLEEN H. CLAFFY, Primary Examiner

C. W. JIRAUCH, Assistant Examiner

U.S. Cl. X.R.

179—100.2; 328—21; 333—29, 30